United States Patent
Keskin

(10) Patent No.: US 10,479,530 B2
(45) Date of Patent: Nov. 19, 2019

(54) AIRCRAFT HIGH-LIFT DEVICE EQUIPPED WITH AT LEAST ONE DIFFERENTIATED COUPLING SYSTEM

(71) Applicant: AIRBUS OPERATIONS (S.A.S.), Toulouse (FR)

(72) Inventor: Deniz Keskin, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 272 days.

(21) Appl. No.: 15/429,809

(22) Filed: Feb. 10, 2017

(65) Prior Publication Data
US 2017/0233107 A1    Aug. 17, 2017

(30) Foreign Application Priority Data
Feb. 12, 2016   (FR) ...................................... 16 51128

(51) Int. Cl.
| | | |
|---|---|---|
| B64F 5/40 | (2017.01) | |
| B64C 9/14 | (2006.01) | |
| B64C 9/16 | (2006.01) | |
| B64F 5/60 | (2017.01) | |

(52) U.S. Cl.
CPC .................. B64F 5/40 (2017.01); B64C 9/14 (2013.01); B64C 9/16 (2013.01); B64F 5/60 (2017.01)

(58) Field of Classification Search
CPC ..... B64F 5/40; B64F 5/60; B64C 9/16; B64C 9/14; B64C 13/30
See application file for complete search history.

(56) References Cited

U.S. PATENT DOCUMENTS

| | | | | |
|---|---|---|---|---|
| 3,045,454 A | * | 7/1962 | Rueb ......................... | F16D 3/38 464/119 |
| 4,180,222 A | * | 12/1979 | Thornburg ................ | B64C 9/06 244/215 |
| 4,441,675 A | * | 4/1984 | Boehringer ............. | B64C 13/24 244/194 |
| 4,779,822 A | * | 10/1988 | Burandt .................. | B64C 13/24 244/213 |
| 4,892,274 A | | 1/1990 | Pohl et al. | |
| 5,743,490 A | * | 4/1998 | Gillingham ............. | B64C 13/38 244/213 |
| 6,076,767 A | * | 6/2000 | Farley ..................... | B64C 13/38 244/212 |
| 6,200,223 B1 | | 3/2001 | Martens | |
| 6,824,099 B1 | * | 11/2004 | Jones ...................... | B64C 13/28 244/203 |

(Continued)

OTHER PUBLICATIONS

French Search Report for French Application No. 1651128 dated Oct. 4, 2016.

*Primary Examiner* — Assres H Woldemaryam
(74) *Attorney, Agent, or Firm* — Jenkins, Wilson, Taylor & Hunt, P.A.

(57) ABSTRACT

An aircraft high-lift device comprising a kinematic chain connected to flaps, the kinematic chain comprising a plurality of shafts connected by coupling systems. This high-lift device comprises at least one differentiated coupling system different from the non-differentiated coupling systems, the differentiated coupling system being configured to be coupled to an adapter and comprising at least one poka-yoke feature. Another subject of the disclosure is an aircraft which comprises at least one high-lift device.

12 Claims, 2 Drawing Sheets

(56) References Cited

U.S. PATENT DOCUMENTS

| | | | | |
|---|---|---|---|---|
| 8,910,906 B2* | 12/2014 | Hill | ................. | B64C 13/28 |
| | | | | 244/131 |
| 9,376,204 B2* | 6/2016 | Winkelmann | .......... | B64C 13/34 |
| 9,630,725 B2* | 4/2017 | Fleddermann | ......... | B64D 45/00 |
| 2005/0151027 A1* | 7/2005 | Recksiek | .............. | B64C 13/503 |
| | | | | 244/211 |
| 2010/0282899 A1* | 11/2010 | Heintjes | ................. | B64C 13/28 |
| | | | | 244/99.5 |
| 2011/0255968 A1* | 10/2011 | Recksiek | .......... | B64D 45/0005 |
| | | | | 416/23 |
| 2012/0108349 A1* | 5/2012 | Foley | ................. | F16D 3/06 |
| | | | | 464/162 |
| 2013/0345908 A1* | 12/2013 | Dorr | ................. | G05B 23/0235 |
| | | | | 701/4 |
| 2014/0187339 A1* | 7/2014 | Kurokawa | ............... | B62D 1/16 |
| | | | | 464/162 |
| 2014/0274425 A1* | 9/2014 | Cohen | ................. | F16D 3/38 |
| | | | | 464/136 |
| 2015/0126291 A1* | 5/2015 | Eitan | ................. | F16D 3/18 |
| | | | | 464/106 |
| 2016/0061273 A1* | 3/2016 | Chase | ................. | F16D 3/78 |
| | | | | 464/51 |

\* cited by examiner

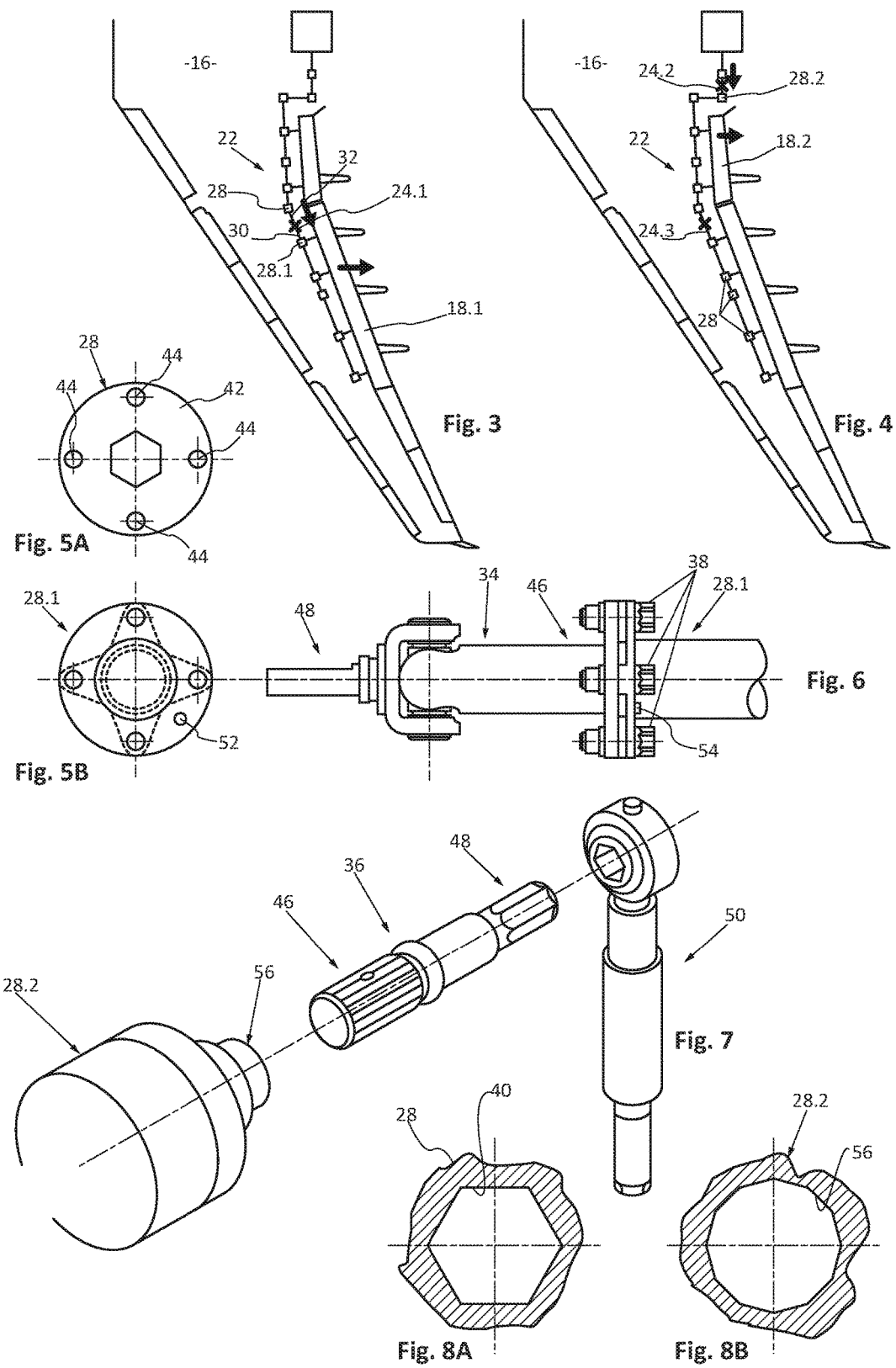

AIRCRAFT HIGH-LIFT DEVICE EQUIPPED WITH AT LEAST ONE DIFFERENTIATED COUPLING SYSTEM

CROSS-REFERENCE TO RELATED APPLICATION

This application claims priority to French Patent Application No. FR 16 51128, filed Feb. 12, 2016, the entire disclosure of which is incorporated by reference herein.

TECHNICAL FIELD

The present disclosure relates to an aircraft high-lift device equipped with at least one differentiated coupling system and to an aircraft equipped with the high-lift device.

BACKGROUND

According to one embodiment illustrated in FIG. 1, an aircraft 10 comprises, at the leading edge 12 and at the trailing edge 14 of each wing 16, high-lift devices which allow the profile of the wing 16 to be modified in order to increase its lift in order to allow the aircraft 10 to fly at low speed in complete safety, for example during the phases of takeoff or landing.

As illustrated in FIG. 2, each high-lift device comprises, at each leading or trailing edge 12, 14, flaps 18 that are mobile between a retracted position in the wing 16 and a deployed position out of the wing 16. For each trailing or leading edge 12, 14, the movement of deploying or retracting the set of flaps 18 is simultaneous and brought about by a plurality of actuators 20 which are connected to one and the same kinematic chain 22 which comprises a plurality of shafts 24 rotating on themselves and arranged end to end.

Each kinematic chain 22 comprises a first shaft coupled to a drive 26 configured to drive the rotation of all the shafts 24 of the kinematic chain 22 and thus, depending on the direction of rotation, bring about the movement that deploys or retracts the flaps 18. The kinematic chain 22 comprises a plurality of coupling systems 28, all identical, each of them connecting two successive shafts 24 or connecting a shaft 24 and an actuator 20.

As illustrated in FIG. 3, when a first flap 18.1 is to be removed during a maintenance operation, a first shaft 24.1 is removed. After that, an adapter is secured to one of the coupling systems 28.1 freed by the first shaft 24.1. This adapter is coupled to an external drive to cause the shafts 24 situated downstream of the removed first shaft 24.1 to pivot so as to cause the first flap 18.1 to deploy to make it easier to remove.

As illustrated in FIG. 4, when a second flap 18.2 is to be removed during a maintenance operation, a second shaft 24.2 and a third shaft 24.3 are removed. After that, an adapter is secured to one of the coupling systems 28.2 revealed by the second shaft 24.2. This adapter is coupled to an external drive to cause the shafts 24 positioned between the removed second and third shafts 24.2 and 24.3 to pivot in order to cause the second flap 18.2 to deploy to make it easier to remove.

During the removal operation, it is absolutely imperative that the adapter be coupled to the appropriate coupling system. If it is not, there is a great risk that at least one of the flaps will become damaged.

Now, there is no way of indicating to an operator that the adapter is not coupled to the appropriate coupling system before the external drive is set to rotate.

SUMMARY

The present disclosure aims to overcome this disadvantage of the prior art. To this end, a subject of the disclosure herein is an aircraft high-lift device comprising a kinematic chain connected to flaps, the kinematic chain comprising a plurality of shafts connected by coupling systems. The high-lift device comprises at least one differentiated coupling system different from the non-differentiated coupling systems, the differentiated coupling system being configured to be coupled to an adapter and comprising at least one error prevention feature, also known as a "poka-yoke" feature.

Insofar as the differentiated coupling system differs from the other non-differentiated coupling systems and comprises a poka-yoke feature, it is not possible to couple an adapter to the other non-differentiated coupling systems. This solution makes it possible to limit the risks of a flap becoming damaged as it is being removed. According to a first alternative form, the poka-yoke feature comprises shapes which collaborate between the differentiated coupling system and the adapter. For preference, the differentiated coupling system comprises a recessed shape configured to accept a projecting shape provided on the adapter.

According to another alternative form, the poka-yoke feature comprises a transmission cross section for the differentiated coupling system that differs from those of the non-differentiated coupling systems. For preference, the transmission cross section of the differentiated coupling system is a recessed shape with a cross section that differs from those of the non-differentiated coupling systems. Advantageously, the recessed shape of the differentiated coupling system has a cross section greater than that of the recessed shapes of the non-differentiated coupling systems.

According to another alternative form, the poka-yoke feature comprises a number of connecting elements for the differentiated coupling system that differs from that of the non-differentiated coupling systems.

According to another alternative form, the poka-yoke feature comprises passage-orifices for the differentiated coupling system at least one of which is positioned differently with respect to the passage-orifices of the non-differentiated coupling systems.

According to another feature, the high-lift device comprises at least two differentiated coupling systems, each differentiated coupling system comprising at least one poka-yoke feature that differs from the other differentiated coupling systems.

Another subject of the disclosure herein is an aircraft which comprises at least one high-lift device according to the disclosure herein.

BRIEF DESCRIPTION OF THE DRAWINGS

Further features and advantages will become apparent from the following description of the disclosure herein, which description is given by way of example only, with reference to the attached drawings in which:

FIG. 3 is a schematic depiction illustrating the kinematic chain visible in FIG. 2 during an operation of removing a first flap;

FIG. 4 is a schematic depiction illustrating the kinematic chain visible in FIG. 2 during an operation of removing a second flap;

FIG. 5A is a face-on view of a non-differentiated coupling system;

FIG. 5B is a face-on view of a differentiated coupling system which illustrates a first alternative form of the disclosure herein;

FIG. 6 is a side view of an adapter coupled to a differentiated coupling system which illustrates the first alternative form of the disclosure herein;

FIG. 7 is a perspective view of an adapter which illustrates a second alternative form of the disclosure herein;

FIG. 8A is a cross section through a coupling section of a non-differentiated coupling system according to one embodiment; and FIG. 8B is a cross section through a coupling section of a differentiated coupling system which illustrates the second alternative form of the disclosure herein.

DETAILED DESCRIPTION

As indicated previously, a high-lift device comprises at least one kinematic chain 22 connected to several flaps 18.

Figure 1:
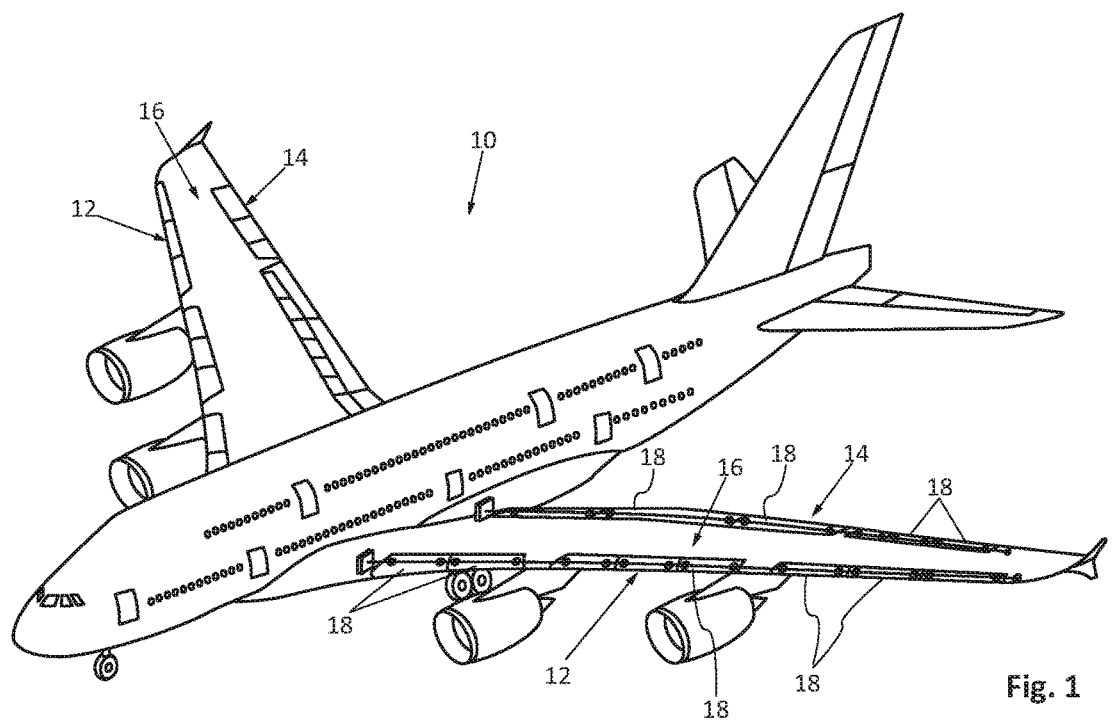
FIG. 1 is a perspective view of an aircraft which illustrates high-lift devices positioned at the leading and trailing edges of each wing.
Figure 2:
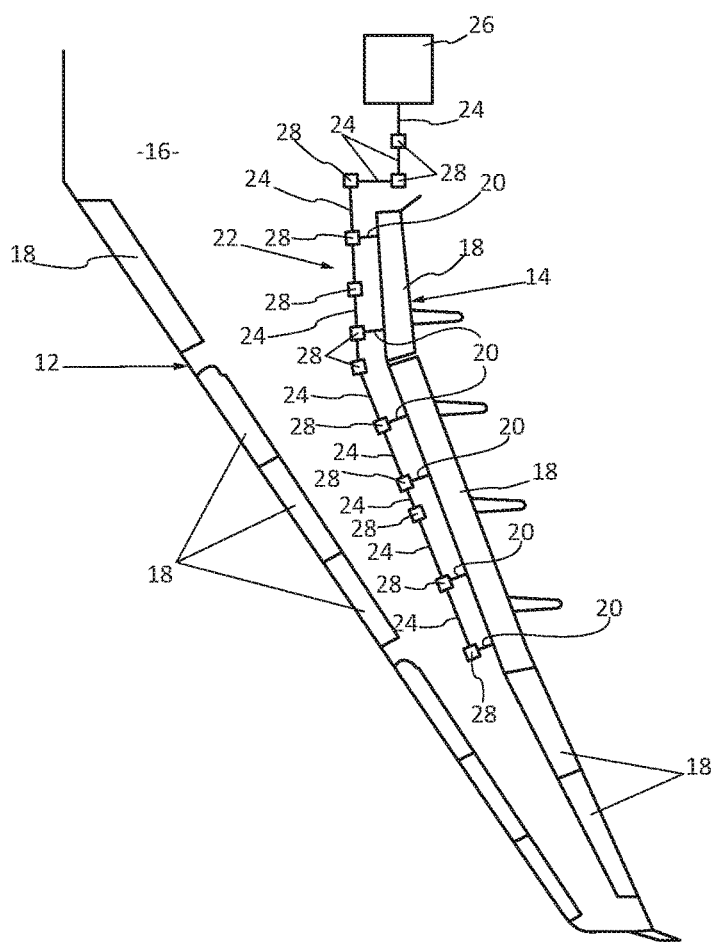
FIG. 2 is a schematic depiction illustrating a kinematic chain configured to cause the flaps of a high-lift device to deploy or retract.

As illustrated in FIG. 2, a kinematic chain 22 comprises at least one actuator 20 for each flap, a plurality of shafts 24 and coupling systems 28 each configured to transmit a rotational movement between two successive shafts 24.

As illustrated in FIG. 3, the kinematic chain 22 comprises at least a first shaft 24.1 which needs to be removed in order to be able to remove a first flap 18.1. This first shaft 24.1 comprises a first end 30 coupled to a first coupling system 28.1 and a second end 32 coupled to another coupling system 28. To remove the first flap 18.1, an adapter 34 is coupled to the first coupling system 28.1.

According to a first configuration visible in FIG. 3, only one shaft is removed in order to remove a flap.

According to a second configuration visible in FIG. 4, two shafts are removed in order to remove a flap.

According to this configuration, the kinematic chain comprises a second shaft 24.2 and a third shaft 24.3 which need to be removed in order to be able to remove a second flap 18.2. Each end of the second and third shafts 24.2 and 24.3 is coupled to a coupling system, one of these coupling systems, referred to as second coupling system 28.2, being coupled to an adapter 36 for the removal of the second flap 18.2.

Whatever the configuration, the kinematic chain 22 comprises at least one coupling system 28.1 or 28.2 that is differentiated from the other coupling systems known as non-differentiated coupling systems, the differentiated coupling system 28.1, 28.2 being configured to be coupled to an adapter 34, 36.

Advantageously, with the exception of the differentiated coupling system(s) 28.1 and 28.2, all the other non-differentiated coupling systems 28 are identical.

Each non-differentiated coupling system 28 is connected to one end of a shaft by a connection which on the one hand comprises cooperating shapes between the shaft and the coupling system for the transmission of a rotational movement, and on the other hand comprises at least one connecting element 38 such as a bolt for example.

According to one embodiment, each non-differentiated coupling system comprises a recessed shape 40 which collaborates with a protruding end of the shaft which has a cross section identical to the cross section of the recessed shape of the non-differentiated coupling system.

According to one embodiment visible in FIG. 8A, the recessed shape 40 of each non-differentiated coupling system 28 has a hexagonal cross section into which the identical cross-section end of a shaft 24 fits.

According to an embodiment visible in FIG. 5A, each non-differentiated coupling system comprises a mounting plate 42 against which there bears a mounting plate provided at the end of a shaft 24 and passage-orifices 44 in the mounting plate 42 which are configured to each house a shank of a connecting element 38.

According to an embodiment visible in FIG. 5A, the connection between a non-differentiated coupling system 28 and a shaft 24 comprises four bolts and the mounting plate 42 of each non-differentiated coupling system 28 comprises four passage-orifices 44.

Advantageously, each adapter 34, 36 comprises a first end 46 configured to be coupled to a differentiated coupling system 28.1, 28.2 and a second end 48 configured to be coupled to an external drive 50.

According to an embodiment visible in FIG. 6, the adapter 34 comprises a joint of the cardan joint type between the first and second ends 46 and 48.

According to one embodiment visible in FIG. 7, the adapter 36 has an approximately cylindrical shape.

The second end 48 of each adapter 34, 36 has a non-circular cross section configured to be coupled to an external drive. Depending on the embodiment, the cross section of the second end 48 of each adapter 34, 36 may be polygonal as illustrated in FIG. 7 or may comprise at least one flat as illustrated in FIG. 6. Of course, the disclosure herein is not restricted to these embodiments.

According to one feature of the disclosure herein, each differentiated coupling system 28.1, 28.2 comprises at least one poka-yoke feature.

According to a first alternative form visible in FIGS. 5B and 6, the poka-yoke feature comprises shapes which collaborate between the differentiated coupling system 28.1 and the adapter 34.

According to one embodiment, the differentiated coupling system 28.1 comprises a recessed shape 52 configured to accept a projecting shape 54, such as a pin, provided on the adapter 34. Because the non-differentiated coupling systems 28 do not comprise this recessed shape 52, the adapter 34 cannot be coupled to them.

According to a second alternative form visible in FIGS. 7 and 8B, the poka-yoke feature comprises a transmission cross section for the differentiated coupling system that differs from those of the non-differentiated coupling systems 28.

According to one embodiment, the transmission cross section of the differentiated coupling system 28.2 is a recessed shape 56 with a cross section that differs from those of the non-differentiated coupling systems 28. To complement that, the adapter 36 comprises a first end 46 with a cross section identical to that of the recessed shape 56 of the differentiated coupling system 28.2. Advantageously, the recessed shape 56 of the differentiated coupling system 28.2 has a cross section greater than that of the recessed shapes of the non-differentiated coupling systems 28. Thus, the adapter 36 cannot be inserted into the recessed shapes of the non-differentiated coupling systems 28.

According to an embodiment visible in FIG. 8B, the recessed shape 56 has a polygonal cross section with twelve sides.

According to another alternative form, the differentiated coupling system 28.2 comprises a protruding shape with a cross section that differs from the non-differentiated coupling systems 28. To complement that, the first end 46 of the adapter comprises a recessed shape which has a cross section identical to that of the protruding shape of the differentiated coupling system 28.2.

According to another alternative form, the poka-yoke feature comprises a number of connecting elements 38 for the differentiated coupling system 28.1, 28.2 that differs from that of the non-differentiated coupling systems 28. According to this alternative form, the differentiated coupling system 28.1, 28.2 comprises a mounting plate with a number of passage-orifices that differs from the number of passage-orifices provided on the mounting plates of the non-differentiated coupling systems 28. According to one embodiment, each connection between a shaft and a non-differentiated coupling system 28 comprises four connecting elements whereas the connection between an adapter 34 and a differentiated coupling system 28.1 comprises five connecting elements. According to this alternative form, an adapter cannot be secured to a non-differentiated coupling system as the number of connecting elements are not the same.

According to another alternative form, the poka-yoke feature comprises passage-orifices for the differentiated coupling system 28.1, 28.2 at least one of which is positioned differently with respect to the passage-orifices of the non-differentiated coupling systems.

One and the same differentiated coupling system 28.1, 28.2 may comprise one or more poka-yoke features.

When a kinematic chain 22 comprises at least two differentiated coupling systems 28.1, 28.2, each differentiated coupling system 28.1, 28.2 comprises at least one poka-yoke feature that differs from the other differentiated coupling systems 28.1, 28.2. Thus, the first differentiated coupling system 28.1 comprises a poka-yoke feature that differs from that of the second differentiated coupling system 28.2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft high-lift device, comprising:
a kinematic chain connected to flaps, the kinematic chain comprising a plurality of shafts connected to one another by non-differentiated coupling systems; and
at least one differentiated coupling system that differs from the non-differentiated coupling systems,
wherein the differentiated coupling system is configured to be coupled to an adapter and comprises at least one poka-yoke feature, and
wherein the adapter is configured to connect the differentiated coupling system to an external drive.

2. The high-lift device according to claim 1, wherein the poka-yoke feature comprises shapes which collaborate between the differentiated coupling system and the adapter.

3. The high-lift device according to claim 2, wherein the differentiated coupling system comprises a recessed shape configured to accept a projecting shape provided on the adapter.

4. The high-lift device according to claim 1, wherein the poka-yoke feature comprises a transmission cross section for the differentiated coupling system that differs from those of the non-differentiated coupling systems.

5. The high-lift device according to claim 4, wherein the transmission cross section of the differentiated coupling system is a recessed shape with a cross section that differs from those of the non-differentiated coupling systems.

6. The high-lift device according to claim 5, wherein the recessed shape of the differentiated coupling system has a cross section greater than a cross section of the recessed shapes of the non-differentiated coupling systems.

7. The high-lift device according to claim 1, wherein the poka-yoke feature comprises a plurality of connecting elements for the differentiated coupling system that differs from those of the non-differentiated coupling systems.

8. The high-lift device according to claim 1, wherein the poka-yoke feature comprises passage-orifices for the differentiated coupling system, at least one of which is positioned differently with respect to passage-orifices of the non-differentiated coupling systems.

9. The high-lift device according to claim 1, comprising a plurality of differentiated coupling systems, each differentiated coupling system comprising at least one poka-yoke feature that differs from other differentiated coupling systems.

10. An aircraft comprising at least one high-lift device according to claim 1.

11. The high-lift device according to claim 2, wherein the non-differentiated coupling systems comprise identical recessed shapes that differ from the recessed shape of the differentiated coupling system.

12. The high-lift device according to claim 1, wherein the external drive is configured to operate the flaps while one or more shaft of the kinematic chain is removed.

* * * * *